United States Patent [19]

Oba et al.

[11] 4,323,662

[45] Apr. 6, 1982

[54] THERMOSETTING RESIN COMPOSITIONS COMPRISING BISMALEIMIDES AND ALKENYLANILINE DERIVATIVES

[75] Inventors: Masayuki Oba; Motoo Kawamata; Hikotada Tsuboi; Nobuhito Koga, all of Yokohama, Japan

[73] Assignee: Mitsui Toatsu Chemicals, Inc., Tokyo, Japan

[21] Appl. No.: 167,145

[22] Filed: Jul. 8, 1980

[30] Foreign Application Priority Data

Jul. 10, 1979 [JP] Japan .................................. 54/86429

[51] Int. Cl.$^3$ .................. C08F 220/52; C08F 222/40; C08F 122/40; C08F 271/02
[52] U.S. Cl. ..................................... 525/281; 525/257; 525/259; 525/260; 525/261; 525/276; 525/282; 525/328; 525/334; 525/336; 525/375; 525/379; 526/261; 526/262
[58] Field of Search ................ 526/262, 261; 525/261, 525/260, 259, 257, 282, 336, 379, 334, 375, 281, 328

[56] References Cited

U.S. PATENT DOCUMENTS

| | | | |
|---|---|---|---|
| 2,989,504 | 6/1961 | Little | 526/262 |
| 3,380,964 | 4/1968 | Grundschober et al. | 526/259 |
| 3,651,012 | 3/1972 | Holub et al. | 525/282 |
| 3,890,272 | 6/1975 | D'Alelio | 526/262 |
| 3,929,713 | 12/1975 | D'Alelio | 526/262 |
| 3,950,279 | 4/1976 | Haug et al. | 526/262 |
| 4,089,845 | 5/1978 | Haug et al. | 526/262 |
| 4,179,551 | 12/1979 | Jones et al. | 526/262 |
| 4,216,297 | 8/1980 | Vaughan et al. | 525/375 |
| 4,220,741 | 9/1980 | Renner et al. | 526/259 |
| 4,229,550 | 10/1980 | Jones et al. | 525/282 |

FOREIGN PATENT DOCUMENTS

| | | | |
|---|---|---|---|
| 54-100488 | 8/1979 | Japan | 526/262 |
| 54-102389 | 8/1979 | Japan | 526/262 |

OTHER PUBLICATIONS

Chem. Abst. vol. 91-58168f, (1979) "Heat Resistant Epoxy Resins" Kawamata et al., Mitsui Toatsu Chem., 3-26-79.

*Primary Examiner*—Lewis T. Jacobs
*Assistant Examiner*—Herbert J. Lilling
*Attorney, Agent, or Firm*—Fisher, Christen & Sabol

[57] ABSTRACT

Disclosed is a thermosetting resin composition comprising (a) a bismaleimide and/or a polymaleimide and (b) at least one member selected from alkenylaniline derivatives, linear dimers thereof, and polymers thereof. In addition to components (a) and (b), this resin composition can contain (c) a polymerizable unsaturated substance.

11 Claims, No Drawings

THERMOSETTING RESIN COMPOSITIONS COMPRISING BISMALEIMIDES AND ALKENYLANILINE DERIVATIVES

BACKGROUND OF THE INVENTION

This invention relates to thermosetting resin compositions having excellent heat resistance and fast-curing properties.

There are a variety of heat-resistant resins which can be used as insulating materials in order to meet the demands for greater capacities, smaller sizes, lighter weights, and higher degrees of reliability of electronic devices and equipments as well as for better heat resistance characteristics, longer service lives, and maintenance-free properties of electrical machinery and apparatus. Among these heat-resistant resins, imide resins of the addition polymerization type, such as bismaleimide resins and aromatic diamine-modified bismaleimide resins, are well known. Such bismaleimide resins have excellent heat resistance, but are not very satisfactory because of the difficulties in processing. The melting points of bismaleimides are high and their curing rates are very low. Moreover, their poor solubility in organic solvents necessitates the use of polar solvents, such as N-methyl-2-pyrrolidone and dimethylformamide, which are undesirable from the viewpoint of environmental pollution. Furthermore, an organic peroxide such as dicumyl peroxide or benzoyl peroxide is usually added to maleimide resins for the purpose of promoting their cure. When such a resin composition is used as impregnating varnish to make prepregs, the cleavage products of the organic peroxide remaining in the prepregs may lead to a reduction in quality and performance of the finally obtained laminates and, especially in the case of copper-clad laminates, to blistering or peeling-off of the copper foil.

It is well known that bismaleimides form a three-dimensional network when they are heated above their melting points or subjected to the action of free radicals. It is also known that the presence of a catalytic amount of a free-radical initiator is desirable for the purpose of achieving an effective crosslinking reaction (see, for example, J. Amer. Chem. Soc., Vol. 81, p. 1187, 1959). By nature, many free-radical initiators have a low activation energy for their decomposition and are unstable and easily decomposable even at room temperature, so that special care must be taken in their storage and handling.

SUMMARY OF THE INVENTION

It is an object of this invention to provide an improved thermosetting resin composition.

It is another object of this invention to provide a thermosetting resin composition which can give a cured product having excellent storage stability, heat resistance, and moisture absorption resistance as well as good electrical and mechanical properties.

It is a further object of this invention to provide an improved thermosetting resin composition which can be used in the manufacture of impregnating resins, adhesives, power paints and coatings, and molding materials.

It is a still further object of this invention to provide a thermosetting resin composition which, when used in the vulcanization of rubber, can exhibit excellent crosslinking and vulcanization-accelerating effects.

These objects are accomplished by providing a thermosetting resin composition comprising (a) a bismaleimide and/or a polymaleimide and (b) at least one member selected from alkenylaniline derivatives, linear dimers thereof, and polymers thereof.

DETAILED DESCRIPTION OF THE PREFERRED EMBODIMENTS

In accordance with one preferred embodiment of this invention, there is provided a thermosetting resin composition comprising:

(a) at least one maleimide selected from the group consisting of bismaleimides having the formula

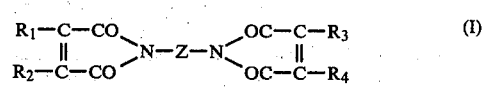

where $R_1$, $R_2$, $R_3$, and $R_4$ are hydrogen atoms, halogen atoms, straight-chain or branched alkyl radicals of from 1 to 10 carbon atoms, phenyl radicals, or substituted phenyl radicals having one or more substituents selected from straight-chain or branched alkyl radicals of from 1 to 10 carbon atoms, halogen atoms, $R_{13}O$-groups in which $R_{13}$ is an aliphatic radical of from 1 to 5 carbon atoms and, if there are two or more radicals represented by $R_{13}$, they may be identical to or different from each other,

groups in which $R_{13}$ is as previously defined, hydroxyl groups, and cyano groups, and the radicals represented by $R_1$, $R_2$, $R_3$, and $R_4$ may be identical to or different from each other, and Z is a divalent organic radical of at least 2 carbon atoms and polymaleimides having the formula

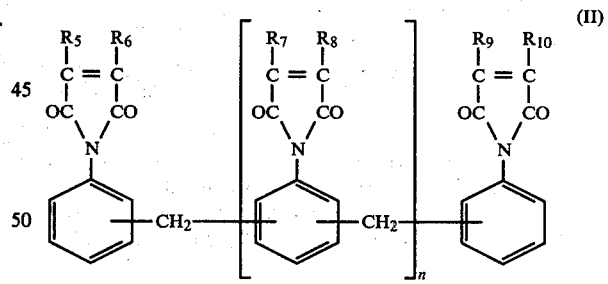

where $R_5$, $R_6$, $R_7$, $R_8$, $R_9$, and $R_{10}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O-$ groups in which $R_{13}$ is as previously defined,

groups in which $R_{13}$ is as previously defined, hydroxyl groups, and cyano groups, and the radicals represented by $R_5$, $R_6$, $R_7$, $R_8$, $R_9$, and $R_{10}$ may be identical to or different from each other, and n is zero or a positive number; and (b) at least one member selected from the group consisting of alkenylaniline derivatives having the formula

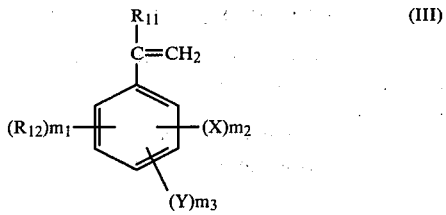

where $R_{11}$ and $R_{12}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O$— groups in which $R_{13}$ is as previously defined,

groups in which $R_{13}$ is as previously defined, hydroxyl groups, and cyano groups, and the radicals represented by $R_{11}$ and $R_{12}$ may be identical to or different from each other, X is a hydrogen atom, halogen atom, carboxyl group,

group in which $R_{13}$ is as previously defined, $R_{13}O$— group in which $R_{13}$ is as previously defined, or cyano group, Y is an amino group, glycidylamino group, diglycidylamino group,

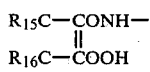

group in which $R_{15}$ and $R_{16}$ are hydrogen atoms, halogen atoms, or straight-chain or branched alkyl radicals of from 1 to 10 carbon atoms and the radicals represented by $R_{15}$ and $R_{16}$ may be identical to or different from each other,

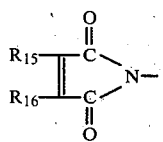

group in which $R_{15}$ and $R_{16}$ are as previously defined,

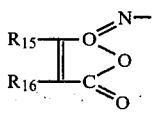

group in which $R_{15}$ and $R_{16}$ are as previously defined,

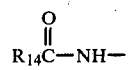

group in which $R_{14}$ is aliphatic radical of from 1 to 20 carbon atoms, alkylamino group of from 1 to 5 carbon atoms, or dialkylamino group in which each alkyl radical has from 1 to 5 carbon atoms, and $m_1$, $m_2$, and $m_3$ are positive integers and the sum of $m_1+m_2+m_3$ has a value of 5; linear dimers thereof; and polymers thereof.

In addition to the aforesaid components (a) and (b), this thermosetting resin composition can contain (c) at least one polymerizable unsaturated substance. The thermosetting resin compositions consisting of components (a), (b), and (c) have more excellent performance than those consisting essentially of components (a) and (b).

A particularly preferred thermosetting resin composition of the invention comprises (a) a bismaleimide of formula (I) in which $R_1$, $R_2$, $R_3$, and $R_4$ are hydrogen atoms, halogen atoms, straight-chain or branched alkyl radicals of from 1 to 5 carbon atoms, or phenyl radicals and the radicals represented by $R_1$, $R_2$, $R_3$, and $R_4$ may be identical to or different from each other, and Z is an organic radical of 2 or more carbon atoms selected from aliphatic, alicyclic, aromatic, and heterocyclic radicals and combinations thereof or a combination of an organic radical as defined above with —O—, —S—, —S—S—, —CO—, —SO—, $SO_2$—, —$CO_2$—, —N=N—, —NH—, or —CONH—; and/or a polymaleimide of formula (II) in which $R_5$, $R_6$, $R_7$, $R_8$, $R_9$, and $R_{10}$ are hydrogen atoms, halogen atoms, straight-chain or branched alkyl radicals of from 1 to 5 carbon atoms, or phenyl radicals and the radicals represented by $R_5$, $R_6$, $R_7$, $R_8$, $R_9$, and $R_{10}$ may be identical to or different from each other, and n has a value of from 0.1 to 10; and (b) an alkenylaniline derivative of formula (III) in which $R_{11}$ and $R_{12}$ are hydrogen atoms, halogen atoms, straight-chain or branched alkyl radicals of from 1 to 10 carbon atoms, or phenyl radicals and the radicals represented by $R_{11}$ and $R_{12}$ may be identical to or different from each other, X is a hydrogen or halogen atom, Y is an amino group, maleimido group, glycidylamino group, or alkylamino group of from 1 to 5 carbon atoms and $m_1$, $m_2$, and $m_3$ are positive integers and the sum of $m_1+m_2+m_3$ has a value of 5.

Specific examples of the radical represented by Z in formula (I) include two or more phenylene or cyclohexylene radicals interconnected either by a simple valence bond or by an atom or inert radical selected, for example, from —O—, —S—, alkylene radicals of from 1 to 3 carbon atoms, —CO—, —$SO_2$—, $NR_{17}$—, —N=N—, —CONH—, —P(O)$R_{17}$—, —CONH—$X_1$—CONH—,

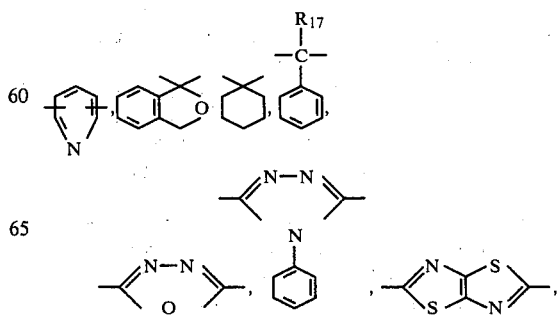

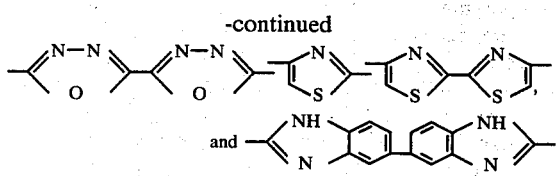

where $R_{17}$ is a hydrogen atom, alkyl radical of from 1 to 4 carbon atoms, phenyl radical, or cyclohexyl radical, and $X_1$ is an alkylene radical of up to 13 carbon atoms. Each phenylene or cyclohexylene radical may have one or more substituents such as methyl radicals.

The above-defined bismaleimides and polymaleimides are exemplified by the following:

Specific examples of the compounds of formula (I) include N,N'-ethylenebismaleimide, N,N'-ethylenebis(2-methylmaleimide), N,N'-trimethylenebismaleimide, N,N'-tetramethylenebismaleimide, N,N'-hexamethylenebismaleimide, N,N'-1,4-cyclohexylenebismaleimide, N,N'-m-phenylenebismaleimide, N,N'-p-phenylenebismaleimide, N,N'-2,4-tolylenebismaleimide, N,N'-2,6-tolyenebismaleimide, N,N'-(oxydi-p-phenylene)bismaleimide, N,N'-(oxydi-p-phenylene)-bis-(2-methylmaleimide), N,N'-(methylenedi-p-phenylene)bismaleimide, N,N'-(methylenedi-p-phenylene)bis(2-methylmaleimide), N,N'-(methylenedi-p-phenylene)bis(2-phenylmaleimide), N,N'-(sulfonyldi-p-phenylene)bismaleimide, N,N'-(thiodi-p-phenylene)bismaleimide, N,N'-(dithiodi-p-phenylene)bismaleimide, N,N'-(sulfonyldi-m-phenylene)bismaleimide, N,N'-(o,p-isopropylidenediphenylene)bismaleimide, N,N'-(isopropylidenedi-p-phenylene)bismaleimide, N,N'-(o,p-cyclohexylidenediphenylene)bismaleimide, N,N'-(cyclohexylidenedi-p-phenylene)bismaleimide, N,N'-(ethylenedi-p-phenylene)bismaleimide, N,N'-(m-xylylene)bismaleimide, N,N'-(p-xylylene)bismaleimide, N,N'-(4,4''-p-triphenylene)bismaleimide, N,N'-(p-phenylenedioxydi-p-phenylene)bismaleimide, N,N'-(methylenedi-p-phenylene)bis(2,3-dichloromaleimide), and N,N'-(oxydi-p-phenylene)bis(2-chloromaleimide). They further include maleimide-terminated phenoxy compounds having the general formula

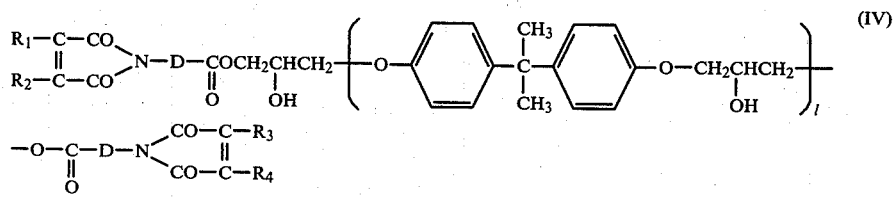

where $R_1$, $R_2$, $R_3$, and $R_4$ are as previously defined for formula (I), D is a divalent organic radical selected from aliphatic, alicyclic, and aromatic radicals, and l is a number having a value of from 0 to 20. Specific examples of the radical represented by D in formula (IV) include methylene, dimethylene, trimethylene, hexamethylene, m-phenylene, and p-phenylene radicals.

Specific examples of the polymaleimides of formula (II) include poly(methylenephenylene) polymaleimides having the formula

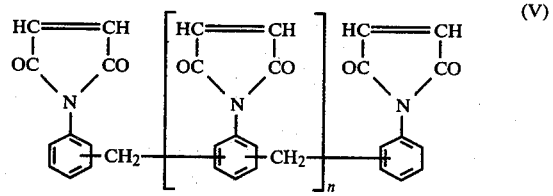

where n is a number having an average value of 0 or greater. These polymaleimides can be obtained by reacting an aniline-formaldehyde condensation product of the formula

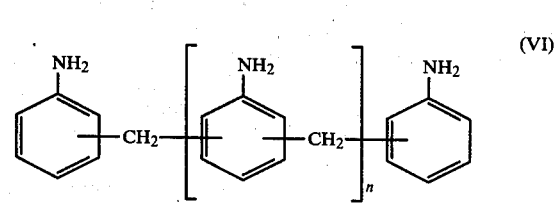

where n is as previously defined, with maleic anhydride according to any conventional procedure. The resulting polymaleimide may contain polymeric by-products having one or more branched structural units of the formula

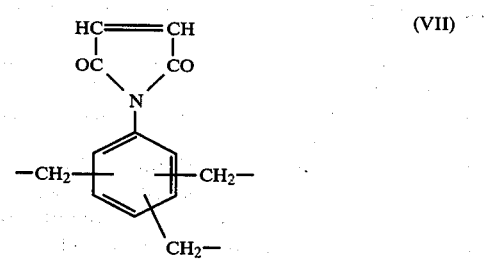

The maleimides of formulas (I) and (II) may be used either alone or in combination.

Specific examples of the alkenylaniline derivatives represented by the formula (III) include
aminostyrene (o-, m-, and p-isomers),
isopropenylaniline (o-, m-, and p-isomers),
isopropenyltoluidine (for example, 1,3,2-, 1,4,2- and 1,2,3-isomers),
vinyltoluidine (for example, 1,3,2-, 1,4,2- and 1,2,3-isomers),
4-amino-α-phenylstyrene,
N-(p-vinyl)maleanilic acid,
N-(p-isopropenylphenyl)maleamic acid,
N-(2-chloro-p-isopropenylphenyl)maleamic acid,
N-(p-vinylphenyl)maleimide,
N-(p-isopropenylphenyl)maleimide,
N-(p-isopropenylphenyl)-2-methylmaleimide,
N-(m-isopropenylphenyl)maleimide, N-(2-methyl-p-isopropenylphenyl)maleimide,
N-(p-α-ethylvinylphenyl)maleimide,
1-vinyl-3-glycidylaminobenzene,
1-vinyl-4-glycidylaminobenzene,
1-vinyl-4-diglycidylaminobenzene,
1-isopropenyl-3-glycidylaminobenzene,
1-isopropenyl-4-glycidylaminobenzene,
1-isopropenyl-4-diglycidylaminobenzene,
N-(p-isopropenylphenyl)isomaleimide,
1-isopropenyl-4-acetylaminobenzene,
1-isopropenyl-4-dimethylaminobenzene, and the like.

Specific examples of the linear dimers of the above-defined alkenylaniline derivatives include
4-methyl-2,4-bis(o-aminophenyl)-1-pentene,
4-methyl-2,4-bis(m-aminophenyl)-1-pentene,
4-methyl-2,4-bis(p-aminophenyl)-1-pentene,
4-methyl-2,4-bis(o-aminophenyl)-2-pentene,
4-methyl-2,4-bis(m-aminophenyl)-2-pentene,
4-methyl-2,4-bis(p-aminophenyl)-2-pentene,
4-methyl-2,4-bis[p-(2'-carboxyvinylcarbonylamino)-phenyl]-1-pentene,
4-methyl-2,4-bis[p-(2'-carboxyvinylcarbonylamino)-phenyl]-2-pentene,
4-methyl-2,4-bis(p-N-maleimidophenyl)-1-pentene,
4-methyl-2,4-bis(p-N-maleimidophenyl)-2-pentene,
4-methyl-2,4-bis(p-N-isomaleimidophenyl)-1-pentene,
4-methyl-2,4-bis(p-N-isomaleimidophenyl)-2-pentene,
4-methyl-2,4-bis(3'-methyl-4'-N-maleimidophenyl)-1-pentene,
4-methyl-2,4-bis(3'-methyl-4'-N-maleimidophenyl)-2-pentene,
4-methyl-2,4-bis(3',5'-dichloro-4'-N-maleimidophenyl)-1-pentene,
4-methyl-2,4-bis(3',5'-dichloro-4'-N-maleimidophenyl)-2-pentene, and the like.

The chemical makeup of the thermosetting resin composition of the invention may vary widely according to the purpose of its use. The weight ratio of the bismaleimide and/or polymaleimide to the alkenylaniline derivative and/or its linear dimer and/or its polymer can generally range from 1:1 to 300:1, the preferred range being from 5:1 to 200:1. If the amount of maleimide used is below the aforesaid limits, the resin composition as used in the form of a varnish will have a shortened pot life and the cured product will show a lowering of thermal stability or heat resistance, while if it is above the aforesaid limits, the resin composition will show a decrease in curing rate and will have such poor curability that the cured product may fail to achieve sufficient mechanical strength.

The thermosetting resin composition of the invention can contain a polymerizable unsaturated substance in addition to the maleimide and the alkenylaniline derivative and/or dimer and/or polymer thereof. The term "polymerizable unsaturated substance" as used herein denotes vinyl monomers, radical-polymerizable unsaturated polymers, and radical polymerizable unsaturated oligomers. Specific examples of the vinyl monomers include styrene, substituted styrenes having their substituent or substituents on the benzene nucleus, acrylonitrile, acrylic acid and its esters, methacrylic acid and its esters, acrylamide, glycidyl acrylate, glycidyl methacrylate, divinylbenzene, divinyltoluene, diallyl phthalate, triallyl cyanurate, tribromophenyl allyl ether, and the like. Specific examples of the radical-polymerizable unsaturated polymers and oligomers include unsaturated polyester, polybutadiene, polychloroprene, polypentadiene, and diallyl phthalate prepolymer; the foregoing polymers and oligomers modified by the addition of stylene, maleic acid, or epoxy resin; cyclic oligomers such as dicyclopentadiene and cyclododecatriene; terpenoids; and the like. These polymerizable unsaturated substances may be used either alone or in combination.

The amount of polymerizable unsaturated substance used depends on whether it is a monomer, polymer, or oligomer. However, the ratio of the combined weight of the maleimide and the alkenylaniline derivative and/or dimer and/or polymer thereof to the weight of the polymerizable unsaturated substance can generally range from 1:50 to 200:1, the preferred range being from 1:20 to 100:1. If the amount of polymerizable unsaturated substance used is above the aforesaid limits, the cured product will show a lowering of heat resistance and storage stability, while if it is below the aforesaid limits, the fluidity of the resin composition will be too low to exhibit good molding properties.

The thermosetting resin composition of the invention can be cured by application of heat. Although no particular limitation is placed on the curing temperature, the preferred range is from 30° to 300° C. It can also be cured by exposure to radiation such as ultraviolet rays, X rays, alpha rays, beta rays, and gamma rays.

Depending on the purpose of its use, the thermosetting resin composition of the invention can be either mixed with one or more additional components or dissolved in an organic solvent. More specifically, if the resin composition is to be used as a molding material, one or more inorganic fillers such as silica, silica glass, clay, aluminum hydroxide, asbestos, glass fiber, mica, gypsum, kaolin, cement, talc, zinc white, graphite, magnesite, molybdenum disulfide, titanium white, silica sand, carbon black, barium sulfate, and calcium carbonate can be incorporated thereinto. Moreover, a conventional flame retarder such as brominated organic compounds, antimony compounds, and phosphorus compounds can be added to the resin composition for the purpose of imparting flame-retardant properties thereto. If the resin composition is to be used in the form of a solution, it can be dissolved in an organic solvent such as N-methyl-2-pyrrolidone, dimethylformamide, dimethylacetamide, dimethyl sulfoxide, dioxane, acetone, methyl ethyl ketone, tetrahydrofuran, cellosolve, methyl acetate, ethyl acetate, chloroform, benzene, toluene, xylene, and chlorobenzene.

The thermosetting resin composition of the invention can give a cured product having excellent heat resistance, storage stability, and moisture absorption resistance as well as good electrical and mechanical properties, and can bring about an improvement in operating efficiency owing to its good molding and fast-curing properties. Accordingly, it has a wide variety of industrial applications and can be used, for example, in the manufacture of impregnating resins, adhesives, powder paints and coatings, and molding materials. Moreover, when used in the vulcanization of rubber, it can exhibit excellent crosslinking and vulcanization-accelerating effects, thereby imparting improved characteristics, such as very high resistance to heat deterioration, to the vulcanized rubber. Thus, it will be apparent to those skilled in the art that the thermosetting resin composition of the invention is an exceptionally good material having a wide spectrum of functionality.

The present invention is further illustrated by the following examples. In these examples, all parts and percentages are by weight unless otherwise noted.

EXAMPLES 1-5

To 53.7 g of N,N'-(methylenedi-p-phenylene)bismaleimide were added 10.5 g, 3.5 g, 2.5 g 1.5 g and 0.8 g, respectively, of N-(p-isopropenylphenyl)maleimide. These ingredients were thoroughly mixed to form a total of 5 resin compositions. Each resin composition was melted on an iron plate preheated to and kept at 180° C., and then stirred well with a spatula to measure the time required for gelation. In addition, the resulting gel was measured by thermogravimetry to measure its loss in weight due to thermal decomposition, the loss in weight being regarded as a measure of its thermal decomposition. The results thus obtained are summarized in Table 1.

TABLE 1

| Example | N,N'-(Methylenedi-p-phenylene)-bismaleimide (g) | N-(p-Isopropenylphenyl)-maleimide (g) | Gelation Time (sec) | Temperature at 1% loss in Weight (°C.) |
|---|---|---|---|---|
| 1 | 53.7 | 10.5 | 20 | 476 |
| 2 | 53.7 | 3.5 | 37 | 500 |
| 3 | 53.7 | 2.5 | 41 | 496 |
| 4 | 53.7 | 1.5 | 77 | 496 |
| 5 | 53.7 | 0.8 | 188 | 496 |

EXAMPLES 6-11

To 53.9 g of N,N'-(methylenedi-p-phenylene)bismaleimide were added 10.0 g, 6.7 g, 3.3 g, 2.4 g, 1.3 g and 0.5 g, respectively, of an equimolar mixture of 4-methyl-2,4-bis(p-aminophenyl)-1-pentene and 4-methyl-2,4-bis(p-aminophenyl)-2-pentene. These ingredients were thoroughly mixed to form a total of 6 resin compositions. The gelation time of each resin composition and its loss in weight due to thermal decomposition were measured in the same manner as described in Example 1. The results thus obtained are summarized in Table 2.

TABLE 2

| Example | N'N'-(Methylenedi-p-phenylene)-bismaleimide (g) | Diamine[1] (g) | Gelation Time (sec) | Temperature at 1% Loss in Weight (°C.) |
|---|---|---|---|---|
| 6 | 53.7 | 10.0 | 57 | 418 |
| 7 | 53.7 | 6.7 | 74 | 438 |
| 8 | 53.7 | 3.3 | 128 | 460 |
| 9 | 53.7 | 2.4 | 134 | 468 |
| 10 | 53.7 | 1.3 | 214 | 478 |
| 11 | 53.7 | 0.5 | 299 | 490 |

[1]An equimolar mixture of 4-methyl-2,4-bis(p-aminophenyl)-1-pentene and 4-methyl-2,4-bis(p-aminophenyl)-2-pentene

EXAMPLE 12

To 53.7 g of N,N'-(methylenedi-p-phenylene)bismaleimide was added 2.4 g of an alkenylaniline derivative composition consisting of 7.5% of p-isopropenylaniline, 63% of 4-methyl-2,4-bis(p-aminophenyl)-1-pentene, 20.7% of 4-methyl-2,4-bis(p-aminophenyl)-2-pentene, and 8.8% of p-isopropenylaniline trimer. These ingredients were thoroughly mixed to form a resin composition. When measured in the same manner as described in Example 11, the gelation time of this resin composition was found to be 124 seconds and the temperature at 1% loss in weight was found to be 472° C.

COMPARATIVE EXAMPLE 1

N,N'-(Methylenedi-p-phenylene)bismaleimide alone was melted on an iron plate preheated to and kept at 180° C., and then stirred well with a spatula to measure the time required for gelation. As a result, the gelation time was found to be 1,307 seconds.

EXAMPLE 13

An intimate mixture of 10 g of styrene, 7 g of N,N'-(methylenedi-p-phenylene)bismaleimide, and 1.5 g of N-(p-isopropenylphenyl)maleimide was prepared. Upon heating at 120° C., it cured in 28 minutes. When styrene was used alone, little polymerization product was noted even after 3 hours' heating at that temperature. Moreover, a mixture of styrene and the aforesaid bismaleimide showed similar unsuccessful results.

EXAMPLE 14

An intimate mixture of 7.0 g of a resin composition (commercially available under the trade name of ESTAR XE7472 from Mitsui Toatsu Chemicals, Inc.), 1.0 g of N,N'-(methylenedi-p-phenylene)bismaleimide, and 0.2 g of N-(p-isopropenylphenyl)maleimide was prepared. The aforesaid resin composition consisted of about 55% of unsaturated polyester, about 45% of styrene, and 0.02% of hydroquinone. Upon heating at 120° C., this mixture cured in 13 minutes. When ESTAR XE7472 was used alone, little polymerization product was noted even after 200 minutes' heating at that temperature.

EXAMPLE 15

An intimate mixture of 10 g of liquid polybutadiene (commercially available under the trade name of NISSO-PB G-1000 from Nippon Soda Company, Limited), 10 g of styrene, 7 g of N,N'-(methylenedi-p-phenylene)-bismaleimide, and 2.0 g of 4-methyl-2,4-bis(p-aminophenyl)-1-pentene was prepared. Upon heating at 120° C., it cured in 21 minutes.

EXAMPLE 16

An intimate mixture of 10 g of liquid polybutadiene (commercially available under the trade name of NEW POLYOIL NX-5 from Nippon Zeon Co., Ltd.), 10 g of styrene, and 7 g of a polymethylene polyphenylene polymaleimide of formula (V) in which n had an average value of 0.8 was prepared. Thus, the aforesaid polymaleimide is represented by the formula

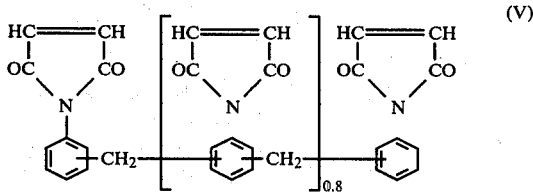

(V)

Upon heating at 120° C., this mixture cured in 27 minutes.

EXAMPLE 17

An intimate mixture of 7.0 g of a resin composition (commercially available under the trade name of ESTAR XE7472 from Mitsui Toatsu Chemicals, Inc.), 1.0 g of N,N'-(methylenedi-p-phenylene)bismaleimide, and 0.2 g of an alkenylaniline derivative composition was prepared. The aforesaid resin composition consisted of about 55% of unsaturated polyester, about 45% of styrene, and 0.02% of hydroquinone, and the aforesaid alkenylaniline derivative composition consisted of 7.5% of p-isopropenylaniline, 42.0% of 4-methyl-2,4-bis(p-aminophenyl)-1-pentene, 30.2% of 4-methyl-2,4-bis(p-aminophenyl)-1-pentene, 30.2% of 4-methyl-2,4-bis(p-aminophenyl)-2-pentene, and 20.3% of p-isopropenylaniline trimer. Upon heating at 120° C., this mixture cured in 11.5 minutes.

What is claimed is:

1. A thermosetting resin composition comprising:
(a) at least one maleimide selected from the group consisting of bismaleimides having the formula

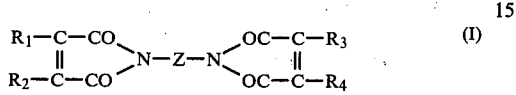 (I)

where $R_1$, $R_2$, $R_3$, and $R_4$ are hydrogen atoms, halogen atoms, straight-chain or branched alkyl radicals of from 1 to 10 carbon atoms, phenyl radicals, or substituted phenyl radicals having one or more substituents selected from straight-chain or branched alkyl radicals of from 1 to 10 carbon atoms, halogen atoms, $R_{13}O-$ groups in which $R_{13}$ is an aliphatic radical of from 1 to 5 carbon atoms and, if there are two or more radicals represented by $R_{13}$, they may be identical to or different from each other,

groups in which $R_{13}$ is as previously defined, hydroxyl groups, and cyano groups, and the radicals represented by $R_1$, $R_2$, $R_3$, and $R_4$ may be identical to or different from each other, and Z is a divalent organic radical of at least 2 carbon atoms and polymaleimides having the formula

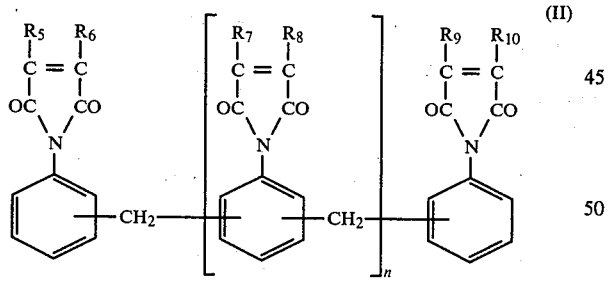 (II)

where $R_5$, $R_6$, $R_7$, $R_8$, $R_9$, and $R_{10}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O-$ groups in which $R_{13}$ is as previously defined,

groups in which $R_{13}$ is as previously defined, hydroxyl groups, and cyano groups, and the radicals represented by $R_5$, $R_6$, $R_7$, $R_8$, $R_9$, and $R_{10}$ may be identical to or different from each other, and n is zero or a positive number; and (b) at least one member selected from the group consisting of alkenylaniline derivatives having the formula

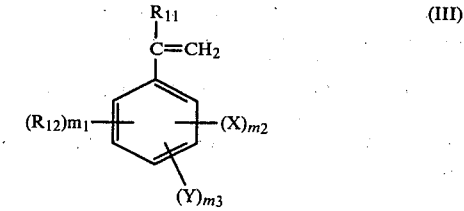 (III)

where $R_{11}$ and $R_{12}$ are hydrogen atoms, halogen atoms, straight-chain or branched alkyl radicals of from 1 to 10 carbon atoms, phenyl radicals, or substituted phenyl radicals having one or more substituents selected from halogen atoms, straight-chain or branched alkyl radicals of from 1 to 10 carbon atoms, $R_{13}O-$ groups in which $R_{13}$ is as previously defined, and cyano groups, and the radicals represented by $R_{11}$ and $R_{12}$ may be identical to or different from each other, X is a hydrogen atom, halogen atom, carboxyl group,

group in which $R_{13}$ is as previously defined, $R_{13}O-$ group in which $R_{13}$ is as previously defined, or cyano group, Y is an amino group, maleimido glycidylamino group, diglycidylamino group,

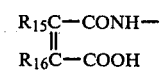

group in which $R_{15}$ and $R_{16}$ are hydrogen atoms, halogen atoms, or straight-chain or branched alkyl radicals of from 1 to 10 carbon atoms and the radicals represented by $R_{15}$ and $R_{16}$ may be identical to or different from each other,

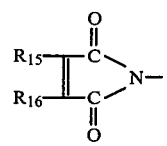

group in which $R_{15}$ and $R_{16}$ are as previously defined,

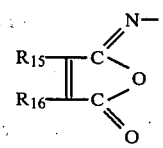

group in which $R_{15}$ and $R_{16}$ are as previously defined,

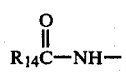

group in which $R_{14}$ is an aliphatic radical of from 1 to 20 carbon atoms, an alkylamino group of from 1 to 5 carbon atoms, or a dialkylamino group in which each alkyl radical has from 1 to 5 carbon atoms, and $m_1$, $m_2$, and $m_3$ are positive integers and the sum of $m_1+m_2+m_3$ has a value of 5, linear dimers thereof, and polymers thereof.

2. The thermosetting resin composition according to claim 1 wherein, in formula (I), $R_1$, $R_2$, $R_3$, and $R_4$ are hydrogen atoms, halogen atoms, straight-chain or branched alkyl radicals of from 1 to 5 carbon atoms, or phenyl radicals and the radicals represented by $R_1$, $R_2$, $R_3$, and $R_4$ may be identical to or different from each other, and Z is an organic radical of 2 or more carbon atoms selected from aliphatic, alicyclic, aromatic, and heterocyclic radicals and combinations thereof or a combination of an organic radical as defined above with —O—, —S—, —S—S—, —CO—, —SO—, —SO$_2$—, —CO$_2$—, —N=N—, —NH—, or —CONH—; in formula (II), $R_5$, $R_6$, $R_7$, $R_8$, $R_9$, and $R_{10}$ are hydrogen atoms, halogen atoms, straight-chain or branched alkyl radicals of from 1 to 5 carbon atoms, or phenyl radicals and the radicals represented by $R_5$, $R_6$, $R_7$, $R_8$, $R_9$, and $R_{10}$ may be identical to or different from each other, and n has a value of from 0.1 to 10; and in formula (III), $R_{11}$ and $R_{12}$ are hydrogen atoms, halogen atoms, straight-chain or branched alkyl radicals of from 1 to 10 carbon atoms, or phenyl radicals and the radicals represented by $R_{11}$ and $R_{12}$ may be identical to or different from each other, X is a hydrogen or halogen atom, and Y is an amino group, maleimido group, glycidylamino group, or alkylamino group of from 1 to 5 carbon atoms.

3. The thermosetting resin composition according to claim 1 wherein the maleimide is N,N'-(methylenedi-p-phenylene)bismaleimide.

4. The thermosetting resin composition according to claim 1 wherein the maleimide is a polymaleimide of formula (II) in which n has a value of from 0.1 to 10.

5. The thermosetting resin composition according to claim 1 wherein the weight ratio of the maleimide to said member ranges from 1:1 to 300:1.

6. The thermosetting resin composition according to claim 1 which contains at least one polymerizable unsaturated substance in addition to said maleimide and said member.

7. The thermosetting resin composition according to claim 6 wherein the polymerizable unsaturated substance is at least one substance selected from the group consisting of vinyl monomers, radical-polymerizable unsaturated polymers, and radical-polymerizable unsaturated oligomers.

8. The thermosetting resin composition according to claim 6 wherein the polymerizable unsaturated substance is at least one vinyl monomer selected from the group consisting of styrene, substituted styrenes, acrylonitrile, acrylic acid, acrylic esters, methacrylic acid, methacrylic esters, acrylamide, glycidyl acrylate, divinylbenzene, divinyltoluene, diallyl phthalate, triallyl cyanurate, tribromophenyl allyl ether and glycidyl methacrylate.

9. The thermosetting resin composition according to claim 6 wherein the polymerizable unsaturated substance is an unsaturated polyester, cyclized polybutadiene, or polybutadiene having a 1,2-double bond.

10. The thermosetting resin composition according to claim 6 wherein the ratio of the combined weight of said maleimide and said member to the weight of the polymerizable unsaturated substance ranges from 1:50 to 200:1.

11. A thermosetting resin composition comprising:
(a) at least one maleimide selected from the group consisting of bismaleimides and polymaleimides; and
(b) at least one member selected from the group consisting of alkenylaniline derivatives, linear dimers thereof, and polymers thereof.

* * * * *